M. D. BANKS.
STREET SWEEPER.
APPLICATION FILED OCT. 4, 1912.
1,094,294.
Patented Apr. 21, 1914.
2 SHEETS—SHEET 1.
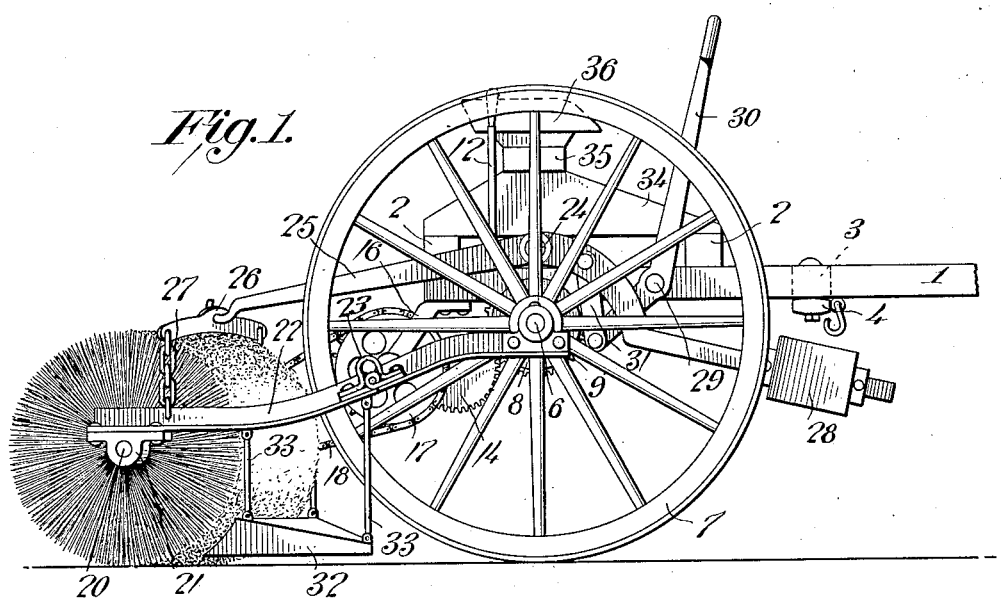
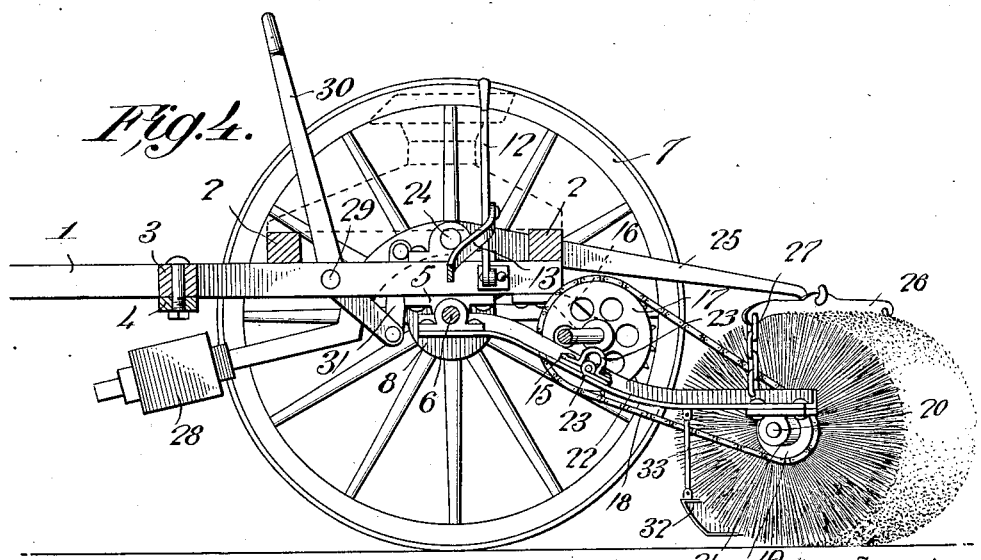
Inventor
M.D. Banks,
Witnesses
Carroll Bailey
By Victor J. Evans
Attorney

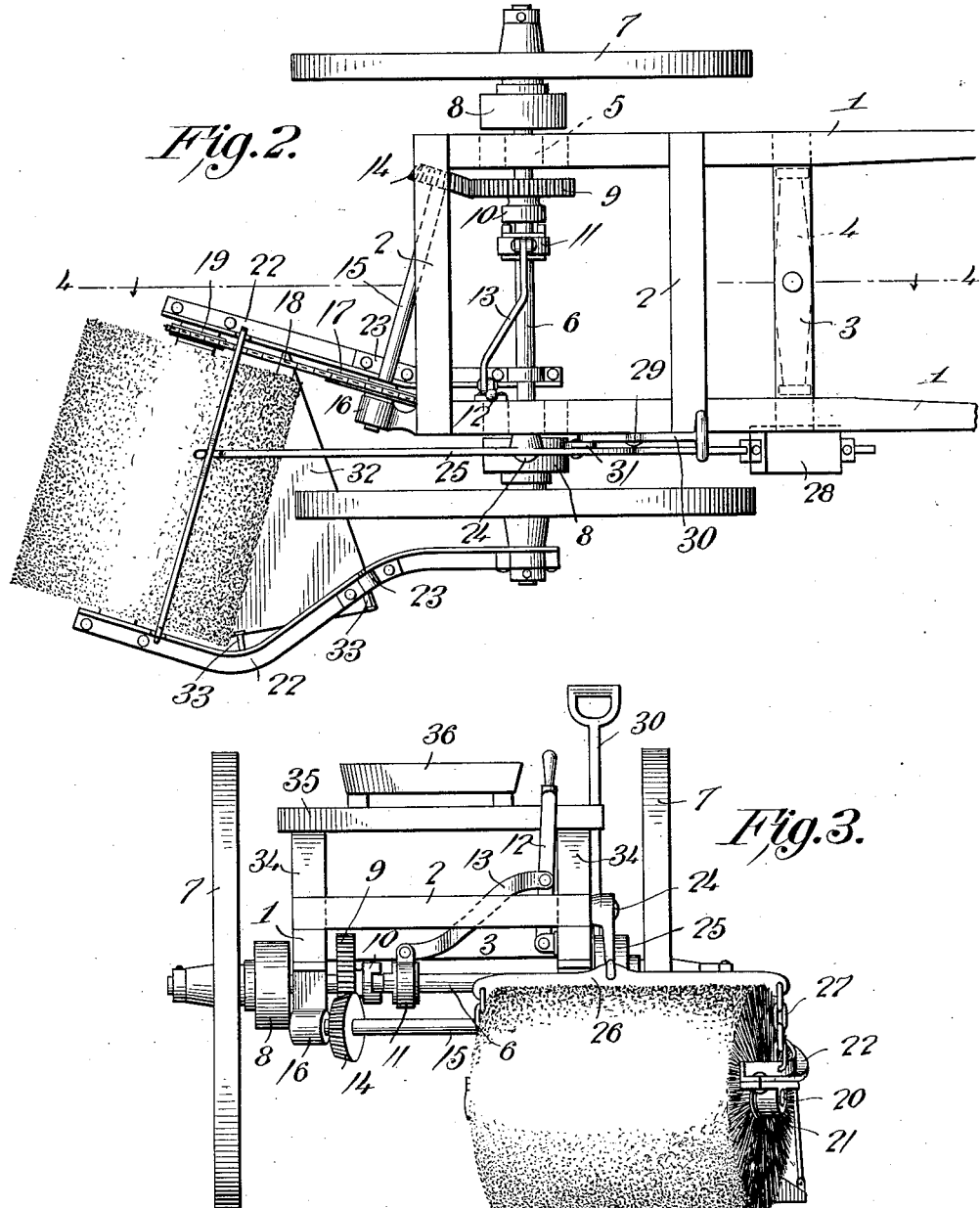

UNITED STATES PATENT OFFICE.

MACK DONALD BANKS, OF COLUMBUS, OHIO.

STREET-SWEEPER.

1,094,294. Specification of Letters Patent. Patented Apr. 21, 1914.

Application filed October 4, 1912. Serial No. 723,968.

*To all whom it may concern:*

Be it known that I, MACK DONALD BANKS, a citizen of the United States, residing at Columbus, in the county of Franklin and State of Ohio, have invented new and useful Improvements in Street-Sweepers, of which the following is a specification.

This invention relates to street sweepers and more particularly to that type which are adapted to sweep the dirt into piles after it has been swept into rows along side the curb.

The primary object of my invention is the provision of a device of the above stated character wherein means are employed for resiliently holding the brush in active position, said means comprising two-part longitudinally disposed arms pivoted to the driving shaft of the vehicle, and spring hinges connecting the adjacent ends of the parts of said arms.

It is the object of this invention to avoid the use of so many broom men.

Further objects of this invention will appear as the following specific description is read in connection with the accompanying drawing, which forms a part of this application, and in which:—

Figure 1 is a side elevation. Fig. 2 is a top plan view. Fig. 3 is a rear elevation. Fig. 4 is a section on the line 4—4 of Fig. 2.

Referring more particularly to the drawings, 1 represents the shafts of the device which are connected together by bridge pieces 2 and 3, the latter having an ordinary swingletree 4 secured thereon. These shafts have suitable bearings 5 secured to their under sides in which is journaled a driving shaft 6 upon which are mounted the wheels 7. Mounted around the axle 6 adjacent each end, are gear casings 8. Intermediate the wheels and the bearings 5, there is loosely journaled upon the shaft 6 a gear wheel 9 which is provided with a clutch face 10 adapted to be engaged by the movable member 11 of the clutch which is splined on the axle and is operated by a lever 12 connected at its lower end to the movable member 11 by a link 13. The gear 9 is in mesh with a beveled gear 14 carried upon a counter shaft 15 journaled in bearings 16 depending from the rear end of the shafts. The opposite end of this shaft 15 has secured thereto a sprocket wheel 17, over which travels a chain 18 connecting the sprocket wheel 17 and a similar sprocket wheel 19 upon the broom shaft 20. The broom shaft is journaled in bearings 21 carried by the outer ends of the broom supporting arms 22 which are pivotally mounted upon the axle or shaft 6, as shown. The arms 22 are preferably formed each in two parts connected together by a spring hinge 23, thereby allowing the broom to give and prevent the breaking of the same in case the latter is accidentally thrown into engagement with the curb and the like. The broom is, as shown, inclined to the longitudinal plane of the vehicle so as to always brush the dirt toward the curb.

Pivotally supported upon a stub shaft 24 carried by one of the shaft members is a lever 25 which is connected to a yoke 26 at its rear end, and in turn, flexibly connected by means of the chains 27 to the arms 22. The forward end of the lever 25 has adjustably mounted thereon, a counter weight 28 which partially balances the weight of the broom and makes the same easy to lift, as will be hereinafter described. In order to raise the broom where a sufficient amount of dirt has been brushed up to form a pile, there is pivoted to one of the shaft members, at 29, a lever 30 which is connected at its lower end beyond the pivot point to the lever 25 by means of the link 31. By releasing this lever, the broom by its own weight, will be lowered into engagement with the ground, while by pulling upon the lever, the broom will be raised and the dirt swept up thereby will be left in the pile. In order to prevent the dirt from flying over upon the curb, an apron 32 is suspended from the arms 22 by means of links 33, as shown in Figs. 1 and 2. Carried upon the cross pieces 2 are seat supporting members 34 which are connected by a cross piece 35 upon which the operator's seat 36 is secured.

In the operation of the device, the machine is driven with the brush running alongside of the curb and brushing up the line or the row of dirt previously swept into such position. When a sufficient quantity of dirt is piled up in front of the broom, the lever is pulled toward the operator, the broom raised, and then immediately dropped so as to repeat the operation for the second pile and so as to leave a well formed pile without a straggling tail in the direction of the next pile being formed.

What is claimed is:—

1. In a device of the class described, the combination with a wheeled vehicle having a driving shaft, of two-part arms pivoted to the shaft, spring hinges connecting the two parts of said arms, a brush journaled in said arms, a driving connection between the brush and the driving shaft, and means to raise and lower the brush.

2. In a device of the class described, the combination with a wheeled vehicle having a driving shaft, of two-part longitudinally disposed arms pivoted to the shaft, spring hinges connecting the adjacent ends of said arms, a brush journaled in said arms, a driving connection between the brush and the driving shaft, and means to raise and lower the brush.

In testimony whereof I affix my signature in presence of two witnesses.

MACK DONALD BANKS.

Witnesses:
HENRY SCHUMACHER,
JACOB F. RUFF.

Copies of this patent may be obtained for five cents each, by addressing the "Commissioner of Patents, Washington, D. C."